United States Patent
Aikens et al.

(10) Patent No.: US 6,216,113 B1
(45) Date of Patent: Apr. 10, 2001

(54) AUDITRON ACCESS PRINTER

(75) Inventors: Andrew J. Aikens, Webster; Fritz F. Ebner, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/323,976

(22) Filed: Oct. 17, 1994

(51) Int. Cl.⁷ .................................................. G06F 17/60
(52) U.S. Cl. ............................... 705/34; 399/79; 399/80; 705/30; 705/400
(58) Field of Search ........................ 355/202; 364/400, 364/401, 464.01; 399/79, 80; 700/90; 705/30, 34, 400

(56) References Cited

U.S. PATENT DOCUMENTS

| | | | |
|---|---|---|---|
| 3,872,282 | * | 3/1975 | Long .................................. 377/13 X |
| 3,971,919 | * | 7/1976 | Fantozzi ........................... 235/92 SB |
| 3,974,363 | * | 8/1976 | Malinich ....................... 235/925 DM |
| 4,470,692 | * | 9/1984 | Shimizu et al. ...................... 399/76 |
| 4,496,237 | | 1/1985 | Schron ............................... 355/14 C |
| 4,511,793 | * | 4/1985 | Racanelli ........................ 364/464.03 |
| 4,941,091 | * | 7/1990 | Breault et al. ......................... 705/30 |
| 4,999,672 | * | 3/1991 | Rice, Jr. et al. ....................... 399/79 |
| 5,146,344 | * | 9/1992 | Bennett et al. .................. 355/202 X |
| 5,270,775 | * | 12/1993 | Suzuki ..................................... 399/8 |
| 5,282,127 | * | 1/1994 | Mii ........................................... 700/1 |
| 5,305,199 | | 4/1994 | LoBiondo et al. .................... 364/403 |
| 5,357,090 | * | 10/1994 | Masai ................................... 235/375 |
| 5,383,129 | * | 1/1995 | Farrell ............................. 364/464.01 |

FOREIGN PATENT DOCUMENTS

| | | | |
|---|---|---|---|
| 0478347 | * | 4/1992 | (EP) . |
| 09-212051 | * | 8/1997 | (JP) . |

OTHER PUBLICATIONS

LeGallee: "Copier control systems do more than curb waste; the units are also valuable toadvertising angencies, engineering and law firms for billing their clients. (Buters Guide)", Office, Mar. 1992, v115, n3, p. 61. (Abstracts Only).*

* cited by examiner

Primary Examiner—Edward R. Cosimano
(74) Attorney, Agent, or Firm—Ronald F. Chapuran

(57) ABSTRACT

An electronic network transaction recording system for accumulating billing data for printing machines interconnected to multiple work stations on the network. A network administrator includes a memory for storing data representing usage of selected printers and a decoder for validating a print job request and a billing account number. Requests for print jobs are verified and billed to an individual or group billing account number.

13 Claims, 5 Drawing Sheets

FIG. 4

AUDITRON ACCESS PRINTER

BACKGROUND OF THE INVENTION

The present invention relates to a billing system for use in printing machines, in particular, printing machines interconnected to multiple stations on a network.

The prior art is replete with methods for obtaining billing information. For example, U.S. Pat. No. 3,974,363 discloses a programmable billing system for use in a stand alone reproduction machine. It provides a means for counting reoccurring events and generating a weighted output value proportional to the billing value of the events. It is also known, as disclosed in U.S. Pat. No. 4,496,237, assigned to the same assignee as the present invention, to store in non-volatile memory indications of machine consumable usage and to be able to display indications of such usage. Further, U.S. Pat. No. 5,305,199, assigned to the same assignee as the present invention, discloses a single tracking system for monitoring inventories of supplies consumed by a network of reprographic machines.

A difficulty with the above described techniques is that there are generally no restrictions on printer usage in a system of multiple workstations or users interconnected to a printer over a network. Another difficulty is the lack of a technique to charge individuals or groups of individuals for usage of printers on the network.

It is an object of the present invention, therefore, to be able to selectively bill individuals or groups of individuals for network usage of printers. It is still another object of the present invention to provide a technique to restrict usage of a printer on a network to legitimate users. Still another object of the present invention is to allocate credit for individual use of a printer on a network, Other advantages of the present invention will become apparent as the following description proceeds, and the features characterizing the invention will be pointed out with particularity in the claims annexed to and forming a part of this specification.

SUMMARY OF THE INVENTION

The present invention is a printing machine billing system for a printing machine electrically interconnected over a network to a plurality of electronic workstations. The printing machine has a plurality of modes of operation to effect recurring events including apparatus for generating a weighted total of events by assigning weighting factors to each event. The apparatus includes counters for generating an output related to events weighting logic for generating weighting factors that are a function of the events, and a totalizer responsive to the counters, the weighting factors, and the mode of operation to determine a billing charge. The network verifies an access code and account number from a workstation in order that the billing charge of the totalizer is charged to a given account number.

BRIEF DESCRIPTION OF THE DRAWINGS

For a better understanding of the present invention, reference may be had to the accompanying drawings wherein the same reference numerals have been applied to like parts and wherein:

FIGS. 4 is a simulated window or screen image for entering a network access code and account number in accordance with the present invention.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DESCRIPTION OF EMBODIMENT

Figure 1:
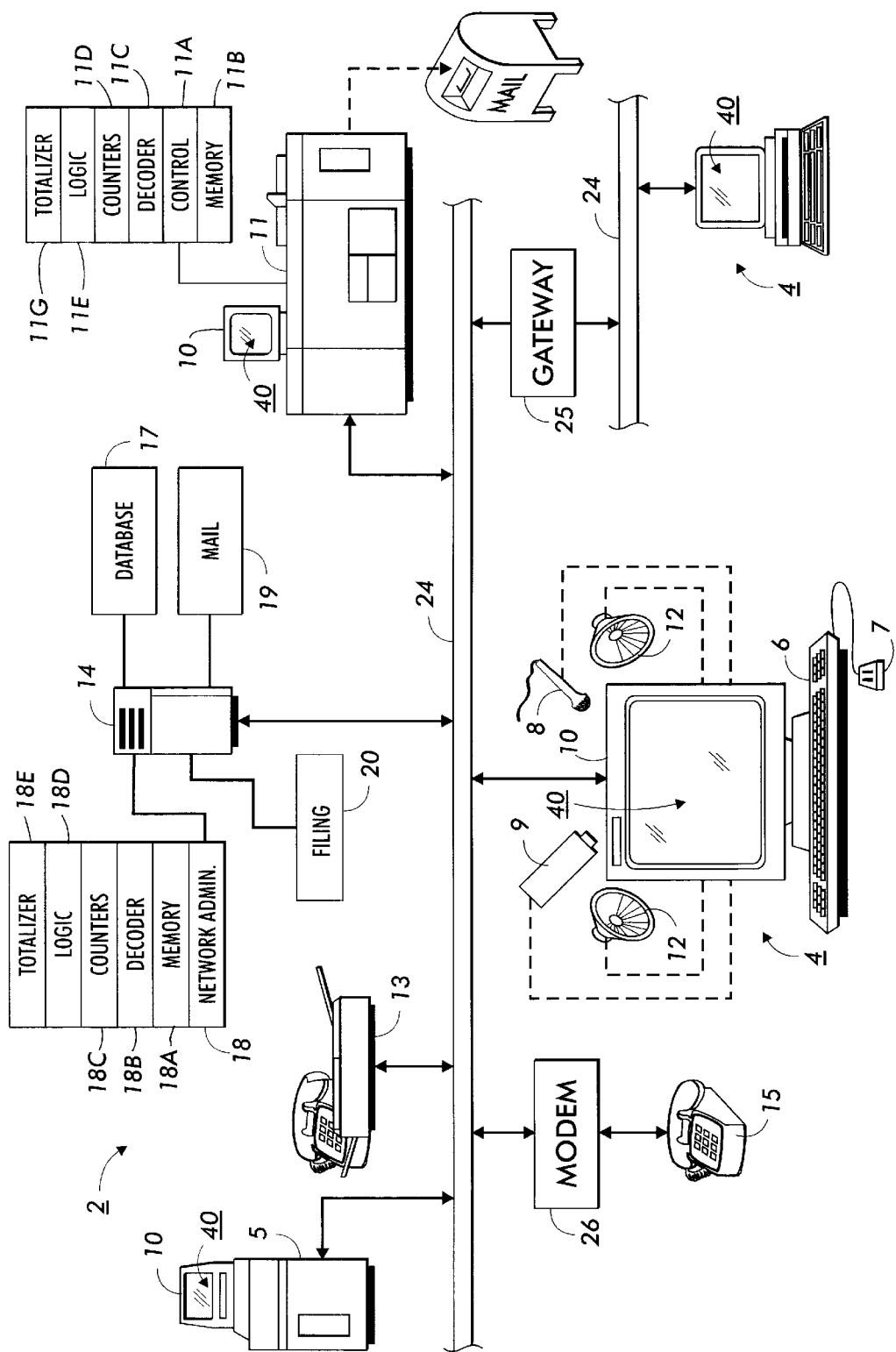
FIG. 1 is an illustration of a system environment incorporating the present invention.

Referring now to the drawings and in particular to FIG. 1, an exemplary multimedia device information system or network 2 including work station 4 enables users to communicate in a transparent and device independent manner. Multimedia system 2 can be implemented using a variety of hardware platforms and includes devices for input including scanner or digital copier 5, keyboard 6, pointing device or mouse 7, microphone 8, and video camera 9. The system further has devices for output including display terminal 10, printer 11 with control 11A in memory 11B, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18 with memory 18A, mail system 19 (e.g. email, voice mail) and data storage and retrieval system 20, and can be physically configured using optical drives, hard drives, floppy drives and/or tape drives. The relational database system 17 provides systems with fast query and retrieval of data.

Work station 4 operates in a collaborative environment, where users at different Work stations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment Work station 4 is connected to other systems and devices through local area network (LAN) 24, gateway 25, and/or modem 26. In distributed systems, a number of Work stations extend distributed processing and storage capabilities to each other, by providing for example redundant storage or a single mounting of a unique application.

Work station 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is GlobalView TM ("GV") software available from Xerox Corporation, which uses abstractions such as a desktop, inbasket, outbasket and documents. It should be noted that the described system is exemplary, and that FIG. 1 could include any number of additional devices such as printers or facsimile machines or other networks connected to LAN 24.

Figure 2:
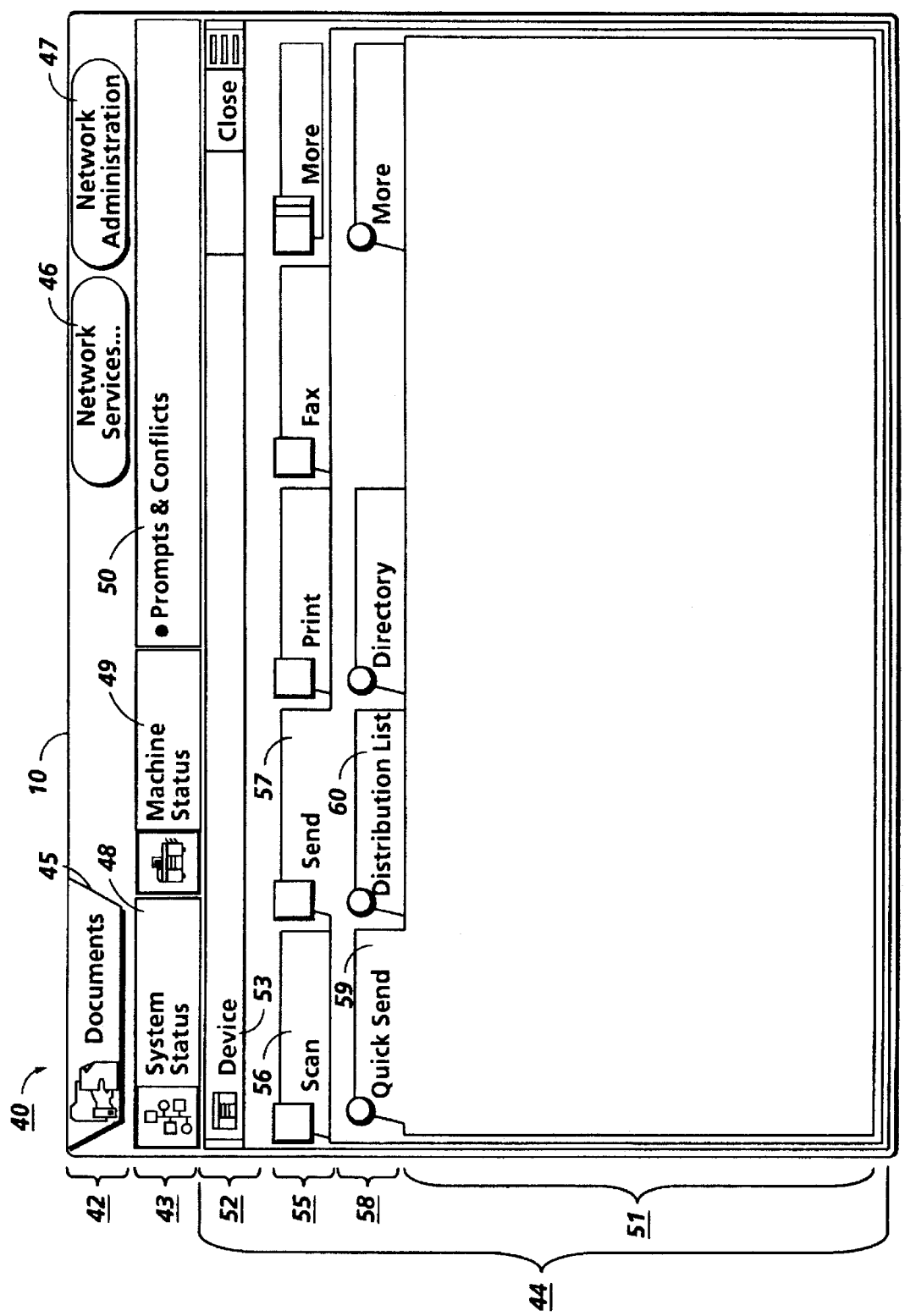
FIG. 2 is an enlarged view of a typical multi-device user interface for use on the display screens shown in FIG. 1.

FIG. 2 shows an embodiment of a multi-function device user interface 40 which is displayed on screens 10 of Work station 4, printer 11 and scanner 5. User interface (UI) 40 can operate remotely from any system; it is extensible across network services using remote windowing protocols such as X windows. For example, the user interface 40 on printer 11 is available remotely from any Work station 4 or alternate service such as scanner 5. Specifically, the user interface 40 is divided into three regions; resource bar 42, status bar 43, and service area 44. Resource bar 42 is a menu bar that provides users access to high level services that are integrated on network 24. Within the resource bar document source or suitcase 45 provides the user with a temporary storage space for documents. Suitcase 45 stores active and editable documents for easy movement across network services, or it is a transitional space where documents are stored while a user navigates through network 24.

Further, provided on resource bar 42 is network services menu 46 and network administration menu 47. Network services menu 46 provides access to any networked service such as printer 11, facsimile 13, scanner 5, file server 20 (private, shared and public file storage), database server 17, mail servers (e.g. voice mail, email, etc.) 19, ports (such as modem 26, network gateway 25), and other Work stations 4. Also, available in services area 44 are published communications channels available from network admin 18. These are channels that have been provided to a utility (not shown) that manages network administration 18. These channels included in a user profile are provided by a user who is to receive data from other users on network 24. Other utilities available in network admin 18 are distribution lists, service access lists and other domain and area network services. Network administration 47 provides users with access to utilities for identification and location of profiles and services. For example, network administration 47 includes information concerning user access privileges as well as resource privileges to file server access.

Status bar 43 is divided into three dedicated message areas, system message area 48, device message area 49, programming conflicts message and prompt area 50. Text is updated in the message area 50 as system status changes. The message area 50 can be selected to reveal more detailed messages. For example, when a printer is down, the message area gives a "Printer Down" message; further selection of the message area 50 provides more detail of causes for the printer to be down. Service area 44 groups and holds related services and features as well as provides user work space 51. A selected device is identified on herald menu 52, that is, cording on menu 52 provides utilities available to the device name 53. For example, device 53 could be a network publishing system with scanning, printing or faxing facilities. Service bar 55 groups services available on service 53. For example, a user could select a service module to access a specific document service (e.g. scan 56 or send 57). Service sub bar 58 provides access to sub-services within service modules. Workspace 51 provides a user area for preparing documents for distribution, which can include publication and archival.

In particular, the send service 57, which is a service displayed on service bar 55, is selected and opened on user interface 40 as shown in FIG. 2. As shown in FIG. 2, the send service 57 has sub service bar 58, with sub-services, quick-send 59 and distribution lists 60. The send service 57 provides virtual links or communication channels to other users on network 24.

Figure 3:
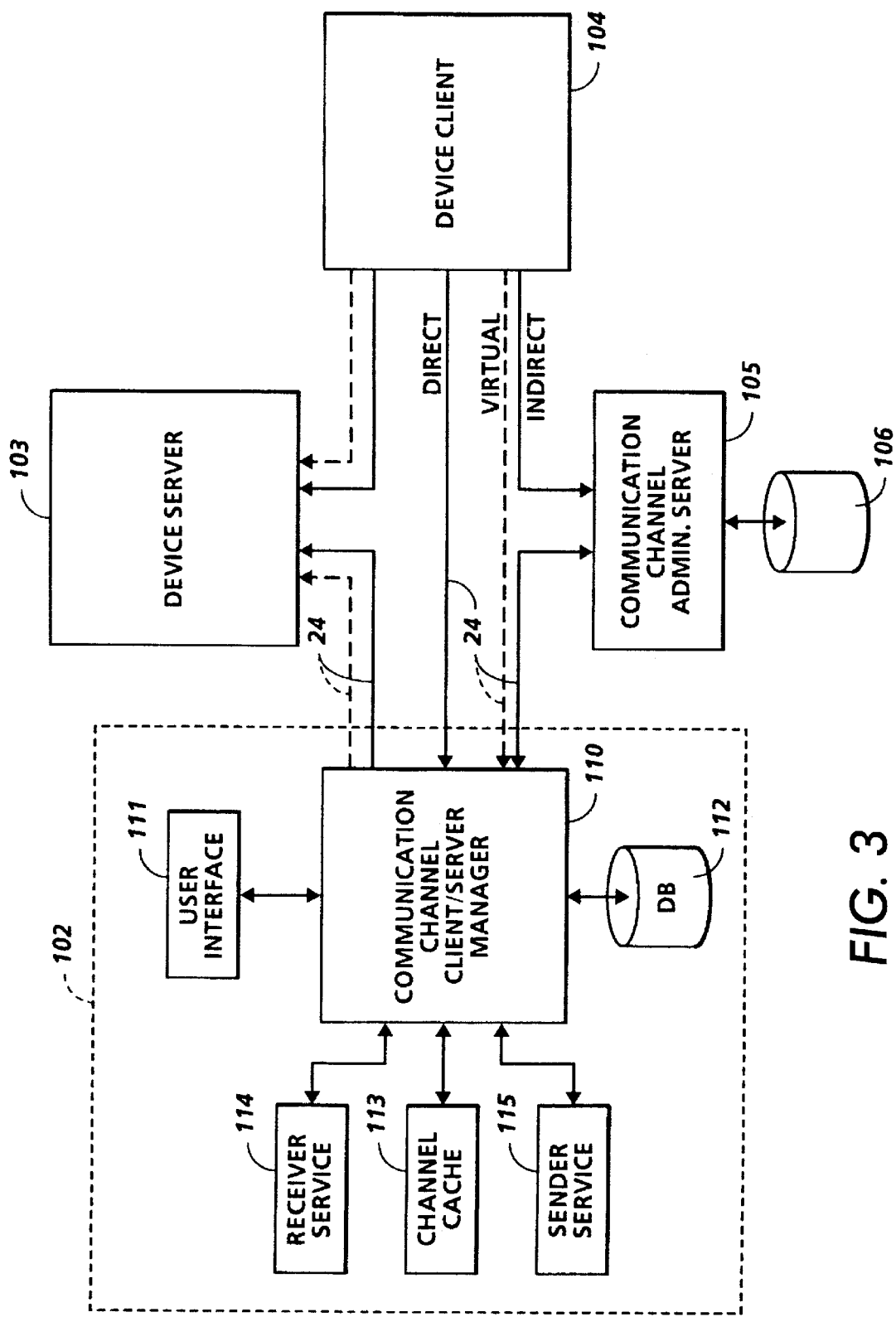
FIG. 3 shows a schematic view of a typical system architecture used in the system environment of FIG. 1.

The channel architecture is based on a client-server relationship, where client facilities are applications that are exported to the network 24, and server facilities are imported from the network. In other words, clients access exported server functionality. Thus, some services (printer, scanners, and the like) may only export or provide server functionality while using no client functionality. As a result, both the channel client and channel server may operate on the same service as well as uniquely on different services. The architecture is shown in detail in FIG. 3, where an integrated client/server system 102 is operating with stand-alone client 104, server 103 and communication channel admin server 105 that provides network administrative facilities such as storing communication channel information on disk 106.

Common to both the client and server architecture is communication channel manager 110. Manager 110 interfaces user interface 111 with network 24, local storage disk 112 and cache 113, receiver service 114 and sender service 115. Local storage available to manager 110 is in the form of long-term storage 112 (e.g. disk, floppy or tape) and short-term fast access, or cache storage, 113. Receiver service 114 provides server functionality while sender service 115 provides client functionality to manager 110. For further detail of an exemplary system, reference is made to pending application D/92365, Ser. No. 07/130,929, incorporated herein.

In accordance with the present invention, there are several options for recording billing data. For example, the data can be recorded in suitable memory such as memory 118 in the printing device for periodic print out or transfer over the network to a billing and accounting station. Another alternative is to convey all billing and accounting data directly to a network billing administrator such as network administrator 18 and memory 18A for processing all billing data. It should be understood that various weighting or billing strategies are well known. For example, various billing rates may depend upon the size of copy sheets required, the relative total volume of sheets required, color requirements, special stock requirements, and duplex verses simplex.

The billing data can be charged to individual accounts, to group accounts, or to predetermined stations. Also, credit systems can be provided. That is, the account system can be set up to allow for predetermined usage per individual account or group account. Upon exceeding the allowed credit, access to a given printer would be excluded.

In operation, the printer control 11A or the network administrator 18 would store in memory 11B, 18A data representing usage of the printer and include a decoder 18B, 11C for responding to a password and validating a print job request. In addition, a billing account number would be logged and usage billed to the billing account number. The printer control or network administrator would include counters 18C, 11D for generating an output related to events, weighting logic 18D, 11E for generating weighting factors such as size and volume that are a function of the events, and a totalizer 18E, 11G to determine a billing charge.

Figure 4:
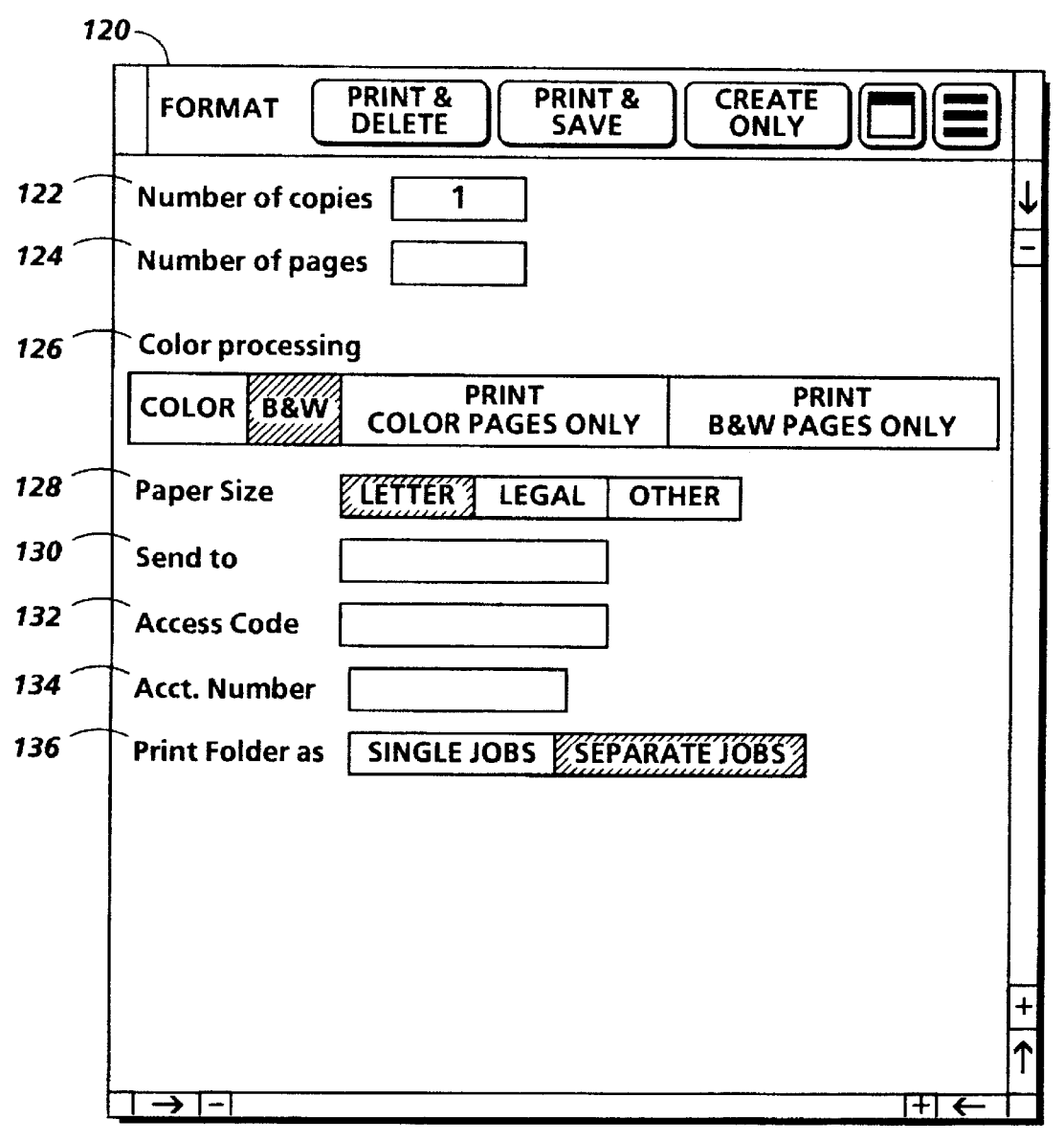

With reference to FIG. 4, in accordance with the present invention, there is shown an interface display or window for characterizing a job requirement to be sent over a network to a printer. Typically there is a designation for a format such as print and delete, print and save, and create only illustrated at 120. Also, there are designations for a number of copies and number of pages as illustrated at 122 and 124, as well as a designation for color processing at 126 for color, black and white, print color pages only, and print black and white pages only. Further, at 128, a paper size such as letter or legal can be designated and at 130 an option to identify a send to address.

In accordance with the present invention, there is also provided a space to provide an access code as shown at 132 and a space to provide an account number shown at 134. Finally at 136 there is a designation to print the folder as single jobs or separate jobs. It should be understood that this is merely one example of a format to designate the characteristics of a particular job to be sent to a given printer, in particular, to provide an access code and an account number to allow entry into the system and to bill the appropriate account for the level of activity of the printer.

Figure 5:
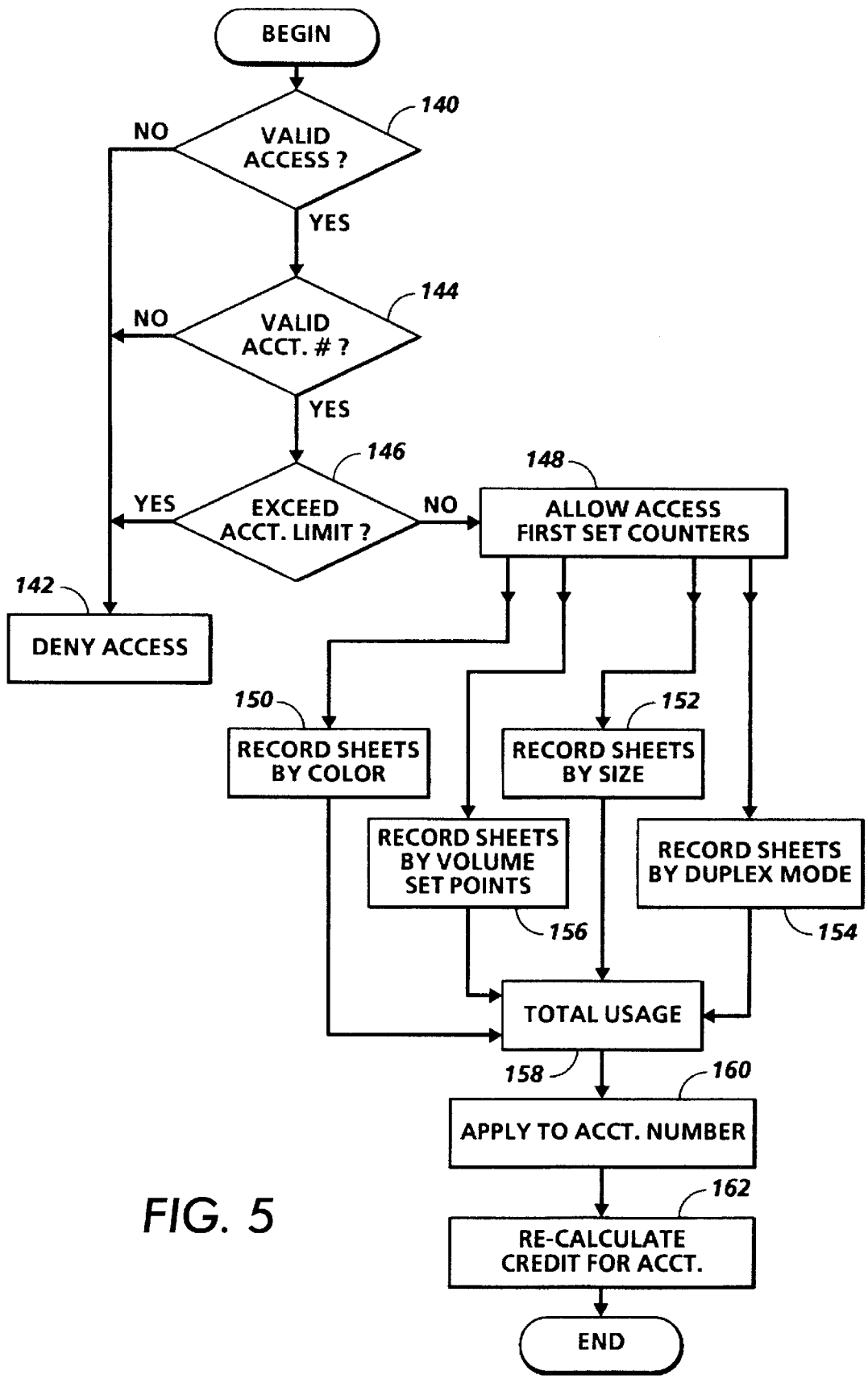
FIG. 5 is a flow chart illustrating network user billing and credit allocation in accordance with the present invention.

A typical scenario for billing a particular print job completed by a printer on a network accessible by a plurality of stations on the network is illustrated in FIG. 5. Initially, as shown at block 140 there is a decision as to whether or an access code is valid. It is assumed that at this particular step in the process, a given printer on the network has already been selected by the operator at the operator interface. However, it is well within the scope of the present invention, that certain operators or stations be limited to a given set of printers on the network and not have access to all the printers on the network. In this case, even though having obtained valid access to the network, another step in the process would be for the operator to select a given printer to complete the operation and for the system to accept the selection of that given printer or deny access to that given printer. At any rate, in the scenario as shown in FIG. 5, if the access code submitted has been rejected by the system, access is denied as shown in block 142.

If there is a valid code and access is given, there is then a determination as to whether or not a valid account number has been provided as shown at block 144. If the entered or designated account number is not an appropriate account number, then access will also be denied to any of the printers on the network as illustrated at block 142. On the other hand if a valid account number is provided, then there is another determination as to whether or not for that particular account number, a given capacity or usage limit has been exceeded by that particular account as shown at block 146. If in fact, the limit for a particular accounted has been exceeded or the projected requirement of the requested job will cause the limit to be exceeded, again access to a given printer or to the network of printers is denied as illustrated at block 142.

Assuming that there is sufficient credit to perform the requested job, then access is allowed and the billing counters are appropriately set as shown at block 148. Blocks 150, 152, 154, and 156 illustrate typical billing counters or meters that can be set to account for a particular job. For example, counters illustrated at 150 would record sheets by color for a particular job. Presumably a higher billing rate would to sheets of color over ordinary black and white sheets. Block 152 illustrates a counter to record sheets by size such as one rate for 8½"×11" sheets, a second rate for 11"×17" sheets, and so on for other size copy sheets. Block 154 illustrates the counting of duplex sheets in another counter with yet another billing rate, and block 156 illustrates recording sheets by volume by applying a rate according to set points. In other words, at one level of sheet volume, there would be one billing rate per copy sheet, at a higher volume total of copy sheets produced there would be another billing rate per copy sheet. It should be understood that for any given job only certain counters would be activated and counting depending upon the characteristics of the job to be completed. At block 158 there is shown a total usage or accumulation of the counts with related rates for the different counters that may be required for a particular job.

The total usage or billing factor as determined at block 158 is then suitably applied to the appropriate account number as shown at block 160. In addition, as illustrated at block 162, if there is a usage limit for the particular account, there would be a recalculation of the remaining credit for that particular account to determine the available capacity or a usage available for the next requested job from the account.

While the invention has been described with reference to the structure disclosed, it is not confined to the details set forth, but it is intended to cover such modifications or changes as may come within the scope of the following claims.

What is claimed is:

1. A printing machine billing system for a printing machine electrically interconnected over a network to a plurality of electronic workstations, each of the workstations having user interfaces, the printing machine having a plurality of modes of operation, each mode operable to effect recurring events, the printing machine including apparatus for generating a weighted total of said events by assigning weighting factors to each event, the apparatus comprising counting means for generating an output related to said events, weighting means for generating a plurality of weighting factors, the weighting factors being a function of the events, and a totalizer responsive to the counting means, the weighting factors, and the mode of operation to determine a billing charge, the network including means to verify an access code and account number from a workstation whereby the billing charge of the totalizer is charged to said account number.

2. An electronic network transaction recording system for accumulating usage data for printing machines electrically interconnected to a plurality of electronic workstations on the network, the electronic workstations including user interfaces for initiating print jobs for said printing machines, the network transaction recording system comprising:

a memory with a plurality of locations for storing information representing printer usage data for a given printer, the data being categorized by occurrences of events, a scanner for periodically scanning the plurality of locations for accumulating the occurrence of events by category to determine total usage data for a given printer, a decoder for validating a print job request and billing account number from a given workstation user interface, and logic to correlate said total usage data with said billing account number.

3. The electronic network transaction recording system of claim 2 wherein the decoder includes means for recognizing an access code.

4. The electronic network transaction recording system of claim 2 wherein the usage data includes a number of printed pages, the size of copy sheets, and the copy sheet material.

5. The electronic network transaction recording system of claim 2 wherein the user interfaces include display screens for initiating print jobs and entering billing account numbers.

6. The electronic network transaction recording system of claim 2 wherein the decoder for validating a print job request includes means to deny access to a printer on the network.

7. An electronic network transaction recording system for accumulating billing data for printing machines comprising:

a network electrically interconnected to a plurality of electronic workstations and a network administrator, at least one printer electrically connected to the network, the electronic workstations having user interfaces for initiating print jobs for said at least one printer, the network administrator including a memory for storing data representing printer usage and a decoder for validating a print job request and a billing account number whereby print jobs are and billed to said billing account number.

8. The electronic network transaction recording system of claim 7 wherein the printer usage data includes the number of printed pages and the size of copy sheets.

9. The electronic network transaction recording system of claim 7 wherein the user interfaces include display screens for initiating print jobs and entering billing account numbers.

10. In a printing machine billing system electrically interconnected over a network to a plurality of electronic workstations, each of the workstations having user interfaces, a method of accounting for printing machine usage comprising the steps of:

selecting a print job from sources on the network, including print characteristics identifying a printing device on the network for printing the print job, and entering an access code and account number from a workstation interface, and validating the access code and account number whereby a billing charge for the print job is charged to said account number.

11. The printing machine billing system of claim 10 wherein the step of identifying a printing device on the network for printing the print job includes the step of identifying a plurality of printing devices.

12. The printing machine billing system of claim 10 wherein the step of validating the access code and account number includes the step of denying access to a printing device.

13. The printing machine billing system of claim 10 wherein the step of validating the access code and account number includes the step of maintaining a print credit for said account number.

* * * * *